United States Patent [19]

Takahashi

[11] Patent Number: 5,055,243

[45] Date of Patent: Oct. 8, 1991

[54] METHOD OF PREPARING CARBON FIBER-REINFORCED CARBON MODULES

[75] Inventor: Susumu Takahashi, Yokohama, Japan

[73] Assignee: KantoYaking Kogyo K.K., Kanagawa, Japan

[21] Appl. No.: 485,604

[22] Filed: Feb. 27, 1990

[51] Int. Cl.$^5$ .................. B29C 71/02; C01B 31/02
[52] U.S. Cl. .................. 264/29.1; 53/427; 53/432; 53/440; 264/30; 264/101; 264/137; 264/294; 423/447.4; 423/449
[58] Field of Search ............ 264/29.1, 29.3, 29.5, 264/29.7, 30, 101, 102, 125, 126, 136, 137, 294; 423/445, 447.1, 447.4, 448, 449; 53/427, 432, 440

[56] References Cited

U.S. PATENT DOCUMENTS 2,376,760  5/1945  Elsey .................. 264/29.6
3,308,943  3/1967  Davila .................. 53/440 X

*Primary Examiner*—Leo B. Tentoni
*Attorney, Agent, or Firm*—Shlesinger Fitzsimmons Shlesinger

[57] ABSTRACT

Binder-impregnated carbon fiber rovings and the like, which are sticky and difficult to handle, are stacked to form modules that are packed in resinous bags under vacuum, and are then shaped to desired dimensions and densities without employing conventional molds, but simply by placing them in the confines of jigs or ruler frames and then releasing them from vacuum and expanding them to the desired dimensions. They are thereafter subjected to heat treatments to provide high temperature resistant carbon fiber-reinforced carbon or graphite modules which work, for example, as thermal insulation and refractory walls in high temperature heating furnaces.

2 Claims, No Drawings

METHOD OF PREPARING CARBON FIBER-REINFORCED CARBON MODULES

BACKGROUND OF THE INVENTION

This invention relates to a method for preparing temperature resistant carbon fiber-reinforced carbon or graphite modules which are employable, for example, for the thermal insulation of walls of high-temperature heating furnaces. The invention is also related to such modules prepared in accordance with this invention.

Conventionally, the type of carbon fiber-reinforced carbon or graphite modules, which have been shaped to desired dimensions, are prepared by impregnating a flock of carbon fibers with resins or pitch, heating the flock within a mold cavity to a temperature of 250-400° C. so that the resins or pitch impregnated in the flock are cured, whereby the flock is shaped to the dimensions of the mold cavity, and then removing the flock or module from the mold and heating it further to a higher temperature of 1,000-1,400° C. for the carbonization thereof. The flock or module might be subjected, if desired, to a further higher temperature of 2,500-3,000° C. to effect the graphitization thereof.

In this way, it is conventional to charge or insert into a mold, carbon fiber chips, fabric, or rovings together with a resin solution which has been applied to them as binders therefor. This charging operation is not easy on account of the tackiness imparted by the resin to the carbon fiber flocks. And, disadvantageously, such conventional method require molds having cavities of different dimensions in accordance with dimensions to which the flocks are to be shaped.

BRIEF SUMMARY OF THE INVENTION

In this invention, carbon fiber chips, fabric or rovings of an indeterminate form are first packed in resinous bags which can be carbonized when heated. After air in the packed bags has been evacuated, a resin solution is sprayed and charged into the bags, whereby the resin working as binders is evenly applied to the carbon fibers in the bags. Thereafter, any air in the bags is again evacuated and the bags are hermetically sealed for obtaining carbon fiber modules packed under vacuum. Such packaged modules or flocks are easy to handle because the sticky carbon fibers are packed in the bags, and because they are compacted by atmospheric pressure.

Such carbon fiber modules that are packed in bags under vacuum are then placed in jigs, such as ruler frames, which define the desired dimensions of the modules, including the thickness, for example, to which the modules are to be shaped. Thereafter pressure inside the bags is relieved to atmospheric, whereby the carbon fibers expand to the desired dimensions permitted by the surrounding jigs or ruler frames. They are then heated to a temperature of 250-400° C. while they are in the frames, so that resin binders applied to the carbon fibers are cured or made infusible. Then, the modules are removed from the frames, and heated to a temperature of 1,000-1,400° C. for the carbonization thereof. If desired, they are heated to a higher temperature of 2,500-3,000° C. for the graphitization thereof. Thus, high temperature resistant carbon fiber-reinforced carbon or graphite modules are readily, economically, and efficiently prepared.

EXAMPLES

This invention is explained hereinunder in more detail by way of the following examples:

Example 1

Ten sheets of nonwoven rovings (10 mm of thickness, 250 mm of width, 500 mm of length, and 37.5 g of weight) made from carbon fibers (12 u of diameter, 70 $Kg/mm^1$ of tensile strength, and 300 $g/m^2$ of weight) were piled in layers, and put into bags made from double linings of polyethylene and nylon. The interiors of the bags were evacuated, and then charged with a resin binder solution made of a mixture of phenol resin of 21 weight %, fine powders of graphite of 9 weight %, and methyl alcohol of 70 weight % so that the carbon fibers were well coated with the binders. The interiors of the bags were again subjected to a vacuum of about 30 torr, and were hermetically sealed.

Carbon fiber modules thus packed in the bags under vacuum, where reduced in thickness to about 16 mm.

These bagged modules were placed between a pair of parallel steel sheets having an interval distance of 30 mm, and defining a so-called jig or ruler frame. The bags were then unsealed so their interiors were relieved to normal atmospheric pressure, and were heated to 250° C. for 60 minutes.

Then the modules were removed from the space between the steel sheets, and were heated to 1,000° C. for 30 minutes to obtain carbon fiber-reinforced carbon modules. In order to make the modules resistant to higher temperature, they are heated to 2,500° C. for obtaining carbon fiber-reinforced graphite modules. The resin bags were melted and had become a part of the modules when the modules were heat-treated.

The carbon or graphite modules had dimensions of about 30 mm of thickness, 250 mm of width, 250 mm of length, and bulk density of 0.1 g/cc.—i.e., 0.1 $gr/cm^3$.

Example 2

Thermal insulation walls structures of high-temperature heating furnaces are generally made of a rectangular graphite box located inwardly in the furnaces, and thermal insulation refractory layers, which are made from graphite or carbon fibers, or graphite powders, and are located outwardly of the graphite box and adjacently to the outer furnace shells.

In accordance with this invention, said thermal insulation refractory layers were prepared readily at the site of the construction of a high temperature heating furnace.

Into spaces between the outer shell of the furnace and its inner rectangular graphite box, there were placed a number of the intermediate modules obtained in the above Example 1, that is, carbon fiber flocks impregnated with resinous binders and packed in plastic bags under vacuum. The contents of the bags were then relieved from vacuum to normal pressure, whereby the above-mentioned spaces were filled with the carbon fiber flocks or modules. The furnace was operated idle first at 250° C. so that resin binders impregnated to carbon fibers within the bags were cured, and then at 1,400° C. The carbon fibers were carbonized. The furnace was thus thermally insulated in-situ by the high temperature resistant carbon fiber-reinforced carbon modules.

I claim:

1. A method of preparing high temperature resistant carbon fiber-reinforced carbon modules, which comprises:

packing modules of carbon fibers in plastic bags, impregnating said fibers with resinous binders, hermetically sealing said bags and the contents thereof under a vacuum;

confining said bagged carbon fiber modules in a predetermined space having the dimensions to which the carbon fiber modules are to be shaped, releasing the contents of said bags from said vacuum whereby the modules of carbon fibers are permitted to expand and to fill said space, and subjecting said modules to a first heat-treatment by which said resinous binders are made infusible, and to a second heat-treatment by which said modules are carbonized to obtain high temperature resistant carbon fiber-reinforced carbon modules.

2. The method as claimed in claim 1, wherein after the modules of carbon fibers impregnated with resinous binders are hermetically sealed under vacuum in said bags, the bagged modules are placed within a high temperature heating furnace adjacent the outer wall thereof, and said first and second heat-treatments of said modules are effected within said furnace by operating the furnace at predetermined temperatures.

* * * * *